US006041163A

United States Patent [19]

Cherry, Jr.

[11] Patent Number: 6,041,163

[45] Date of Patent: Mar. 21, 2000

[54] APPARATUS FOR CONTROLLING A PUMP MOTOR OF A FORKLIFT TRUCK

[75] Inventor: Wesley Robert Cherry, Jr., Mayfield Heights, Ohio

[73] Assignees: Daewoo Heavy Industries Ltd., Incheon, Rep. of Korea; Daewoo Heavy Industries America Corporation, Carlstadt, N.J.

[21] Appl. No.: 09/064,854

[22] Filed: Apr. 23, 1998

[51] Int. Cl.[7] ........................ H02P 5/17

[52] U.S. Cl. ........................ 388/811; 388/815; 388/930; 318/430; 318/432

[58] Field of Search ........................ 388/800–815, 388/930; 318/430, 432, 433, 434

[56] References Cited

U.S. PATENT DOCUMENTS 4,673,851 6/1987 Disser ........................ 388/831

4,933,614 6/1990 Kawata ........................ 318/432

*Primary Examiner*—David Martin

[57] ABSTRACT

A pump motor control apparatus is adapted to control a pump motor of a forklift truck by using a driving transistor connected between a battery and the pump motor. The pump motor control apparatus includes a current detection circuit for detecting a current flowing through the pump motor to generate a current detection signal representing the current. A controller is employed to determine the load condition based on the current detection signal to thereby generate a control signal for use in the control of the driving transistor. The control signal is a pulse width modulation signal whose on-duty ratio is controlled depending on the load condition so as to decrease the torque and speed of the pump motor during the unloaded condition but to increase the torque and speed of the pump motor during the loaded condition.

4 Claims, 4 Drawing Sheets

APPARATUS FOR CONTROLLING A PUMP MOTOR OF A FORKLIFT TRUCK

FIELD OF THE INVENTION

The present invention relates to an apparatus for controlling a pump motor of a forklift truck, and more particularly to a control apparatus of a pump motor of a forklift truck whereby, during the operation of a working implement of the forklift truck, the torque of a pump motor can be properly controlled in close response to the variation of a load with which the working implement bears.

BACKGROUND OF THE INVENTION

Forklift trucks have been used either to lift objects of relatively heavy weight up to an elevated location or to move the objects from one place to another within a limited working site. Depending on the power sources employed, the forklift trucks are classified into an engine-driven forklift truck which may usually operate in an outdoor area and an electromotive forklift truck which are suitable for indoor operation, thanks to its reduced or little emission of exhaust gas and noise.

It is well known in the art that the electromotive forklift trucks carry out the steering operation and the tilting and lifting operation through the use of a pressurized working fluid discharged from a hydraulic pump which in turn is rotatingly driven by an electric pump motor. The working fluid is fed to a priority valve that serves to supply the working fluid preferentially to a steering unit to thereby assure stable steering operation at all times. The surplus fluid is directed to such an working implement as a lift cylinder and a tilt cylinder by way of a control valve unit.

The discharge volume of the hydraulic pump depends primarily on the torque of the electric pump motor, the torque and speed of which is controlled by means of a pump motor controller. An example of the prior art pump motor controller is shown in FIG. 1 wherein a battery 10 is employed to feed electricity to the respective one of electric devices of the forklift truck. The pump motor controller further includes a key switch 11 for producing a key input signal to start up the forklift truck and a mast manipulation switch 12 for effecting the tilting and lifting operation of the working implement. A valve control unit 13 functions to control hydraulic valves for selectively supplying the working implement with the pressurized fluid in response to the switching signals from the mast manipulation switch 12. Responsive to the valve control signals from the valve control unit 13, a controller 14 is adapted to produce pulse width modulation signals of a predetermined on-duty ratio which can be used to control a pump motor 15. A driving transistor 16 responds to the pulse width modulation signals to enable the battery 10 to supply electricity to the pump motor 15, while a flywheel diode 17 has a function to assure continuous flow of an electric current through the pump motor 15. The cathode of the flywheel diode 17 is connected to between the emitter of the driving transistor 16 and the pump motor 15, with the anode thereof being grounded.

The pump motor controller of the construction as noted above is operable in the following manner. As the driver turns on the key switch 11 to start up the forklift truck, the electric current is fed from the battery 10 to a travel motor (not shown) and the pump motor 15, thereby energizing them at the same moment. Pressing the mast manipulation switch 12 for the sake of performing the tilting and lifting operation causes the valve control unit 13 to properly shift the control valves (not shown), whereby switching signals indicative of the valve actuation is applied to the controller 14. Concurrently fed to the controller 14 are steering signals which represent the steering condition in the travelling process of the forklift truck.

In response to the switching signals and the steering signals, the controller 14 supplies the driving transistor 16 with pulse width modulation signals of a predetermined on-off duty ratio, which causes the driving transistor 16 to be switched such that an electric current corresponding to the pulse width modulation signals can flow from the collector to the emitter of the driving transistor 16 to thus energize the pump motor 15. At this moment, the flywheel diode 17 makes smooth the negative electromotive forces developed at the opposite ends of the pump motor 15 in the event of shut-down of the driving transistor 16, assuring a reduced consumption of the battery electricity and a suppressed over-voltage owing to the inductive resistance of the pump motor 15.

According to the prior art pump motor controller as referred to above, the on-off duty ratio of the pulse width modulation signals is predetermined, meaning that the torque and speed of the pump motor is controlled depending solely on the on-off duty ratio of the pulse width modulation signals but regardless of the load variation exerting on the pump motor. This makes it impossible to precisely control the torque of the pump motor in close response to the load variation. Moreover, controlling the pump motor in this manner tends to create irregular noise in the pump motor and fluid lines especially under the unloaded condition, adversely affecting the convenience of forklift operation.

SUMMARY OF THE INVENTION

With the drawbacks of the prior art pump motor controller in mind, it is an object of the invention to provide an apparatus for controlling a pump motor of a forklift truck which enables the pump motor torque to be controlled on a real time basis depending exactly on the variation of the load applied to the pump motor, while reducing the level of noise under the unloaded condition.

In accordance with the present invention, there is provided an apparatus for controlling a pump motor of a forklift truck by using a driving transistor connected between a battery and the pump motor. The apparatus comprises current detection means for detecting a current flowing through the pump motor to generate a current detection signal representing the current and control means for determining a load condition based on the current detection signal to thereby generate a varying control signal for use in the control of the driving transistor. Depending upon the load condition, the control signal varies to reduce the torque and speed of the pump motor during the unloaded condition but to increase the torque and speed during the loaded condition.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
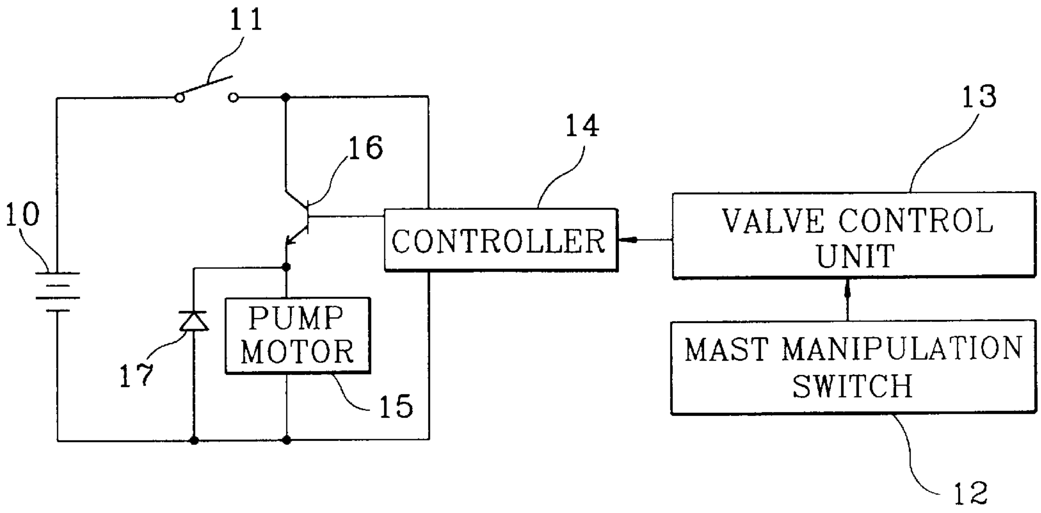
FIG.1 PRIOR ART
FIG. 1 is a schematic circuit diagram showing a conventional pump motor controller of a forklift truck.
Figure 2:
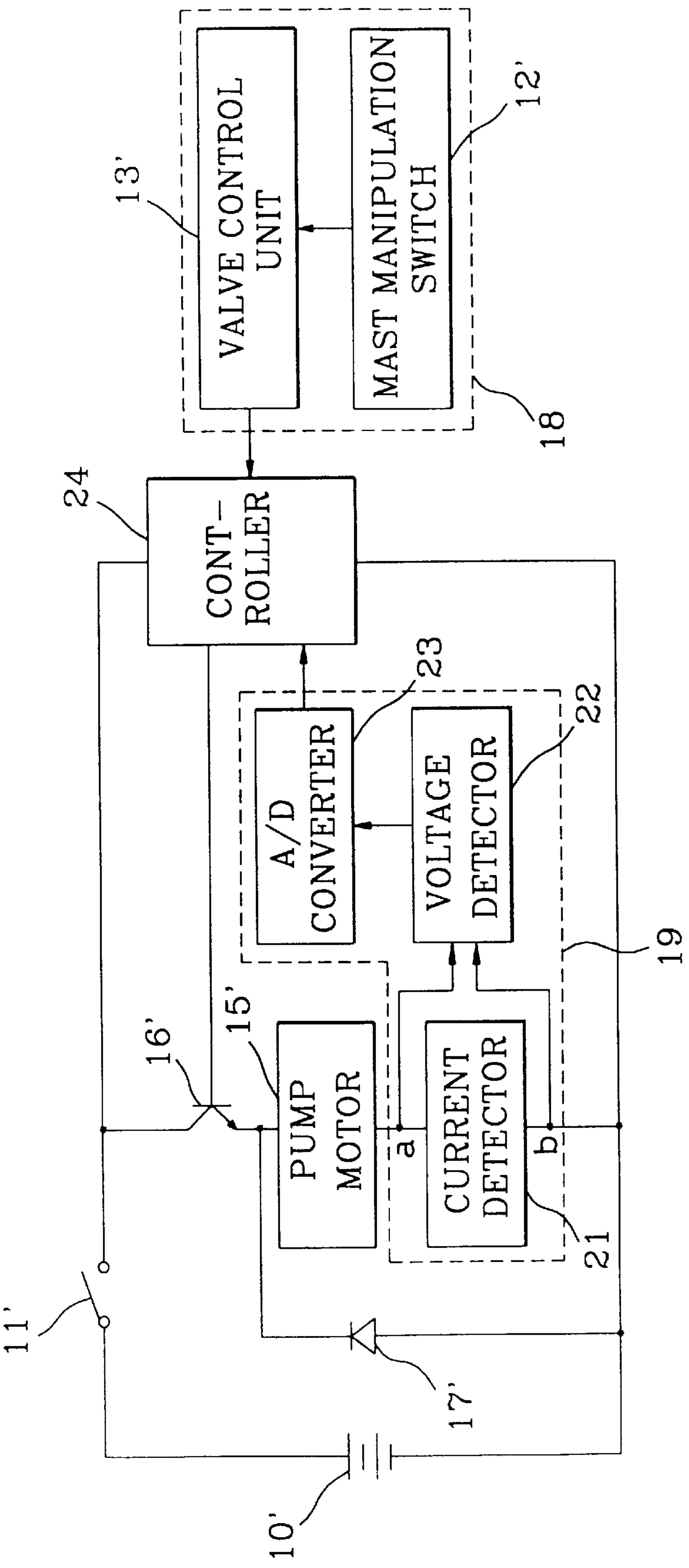
FIG. 2 is a schematic circuit diagram illustrating a pump motor control apparatus of a forklift truck in accordance with the present invention.

Referring now to FIG. 2, there is shown a pump motor control apparatus in accordance with the present invention. A pump motor 15' is utilized to rotatingly drive a hydraulic pump(not shown) and is connected via a key switch 11' and a driving transistor 16' to a battery 10'. The hydraulic pump serves to discharge a pressurized working fluid for use in carrying out the steering operation and the lifting operation of the forklift truck. The discharge volume of the hydraulic pump depends primarily on the torque of the pump motor 15' which is controlled by the amount of electric current provided thereto.

The pump motor control apparatus includes a driving transistor 16' connected between the battery 10' and the pump motor 15' and a controller 24 for generating a pulse width modulation (PWM) signal as a transistor control signal for use in controlling the driving transistor 16'. When the key switch 11' is turned on by the user, the amount of the electric current provided to the pump motor 15' is controlled by the driving transistor responsive to the PWM signal.

In accordance with the present invention, the pump motor control apparatus is designed to generate the transistor control signal based on a valve control signal and a current detection signal. In order to generate the valve control and the current detection signals, the pump motor control apparatus includes two portions: a valve control portion 18; and a motor current monitoring portion 19. The valve control portion 18 is provided with a mast manipulation switch 12' and a valve control unit 13'. The mast manipulation switch 12' is adapted to, when activated, generate a switch signal denoting a selected work, e.g., a steering operation or a tilting and lifting operation, while the valve control unit 13' responds to the switch signal to provide the valve control signal to the controller 24.

It should be appreciated that the motor current monitoring portion 19 includes a current detector 21, a voltage detector 22, and an analog-to-digital(A/D) converter 23. The current detector 21 is implemented by using a shunt which is connected between the battery 10' and the pump motor 15' and serves to detect electric current following through the pump motor 15' to generate a first voltage signal representing the detected current via terminals a and b. The current varies with the load conditions including an unloaded condition and a loaded condition. The first voltage signal is then coupled to the voltage detector 22 which serves to amplify it up to a predetermined voltage level to generate a second voltage signal. By way of the A/D converter 23, the second voltage signal is converted into a digital voltage signal which in turn is fed to the controller 24 as the current detection signal.

Consequently, the controller 24 serves to generate a PWM signal, as the transistor control signal, in response to the valve control signal and the current detection signal. In other words, the on-duty ratio of the PWM signal is first determined by the valve control signal and then the determined on-duty ratio is adjusted based on the current detection signal. The PWM signal with the adjusted on-duty ratio is then used for the purpose of controlling the driving transistor 16' so that the driving current flowing through the pump motor 15' can be determined by the operation of the driving transistor 16'. The torque and speed of the pump motor 15' is controlled depending on the transistor driving current to thereby allow the hydraulic pump to produce a corresponding quantity of pressurized fluid for use in carrying out the steering operation and/or the lifting operation of the forklift truck. This means that the controller 24 determines the unloaded condition and the loaded condition by using the current detection signal and controls the driving transistor by using the adjusted PWM signal to thereby maintain the torque and speed of the pump motor 15' as low as possible during the unloaded condition so as not to cause hydraulic cavitation but to increase the torque and speed during the loaded condition.

Figure 3:
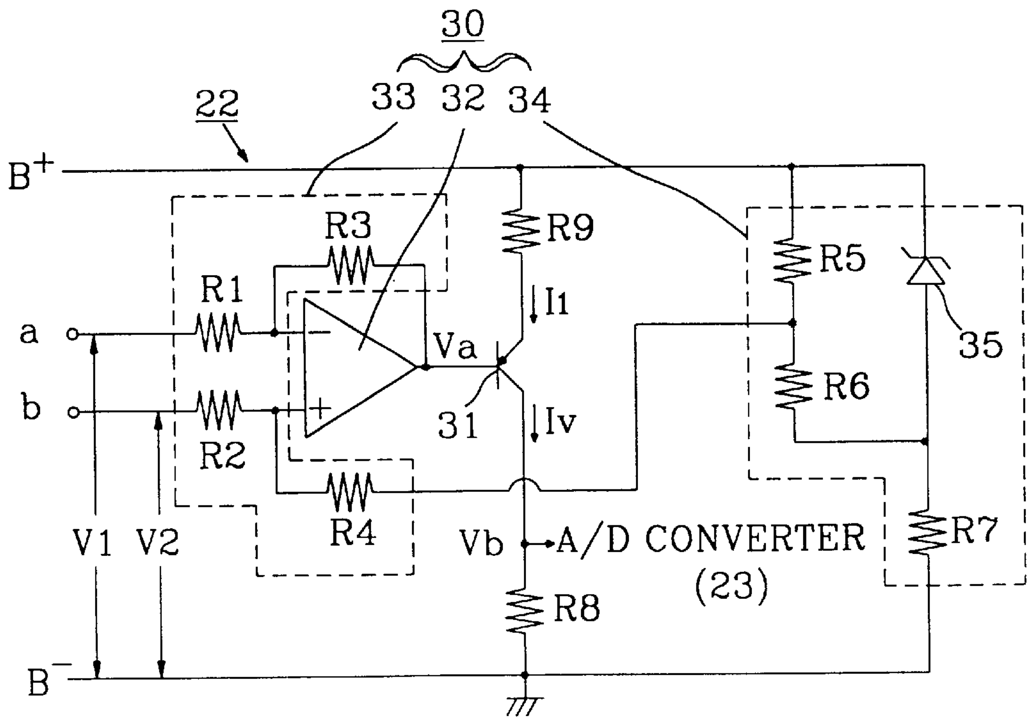
FIG. 3 is a detailed circuit diagram depicting a voltage detection circuit in accordance with a preferred embodiment of the present invention.

Referring to FIG. 3, there is illustrated a voltage detector 22 in accordance with a preferred embodiment of the present invention. The voltage detector 22 includes an operational amplifier circuit 30, a current control transistor 31, a current limit resistor R9 and an output resistor R8.

The operational amplifier circuit 30 includes an operational amplifier 32, a gain decision circuit 33 and a bias circuit 34. The gain decision circuit 33 serves to determine the gain of the operational amplifier 32 and is provided with resistors R1 to R4, wherein the resistors R1 and R2 are connected to the inverted and non-inverted input terminals of the operational amplifier 32. The resistor R3 is connected between the inverted input terminal and the output terminal of the operational amplifier 32, whereas the resistor R4 is coupled between the bias circuit 34 and the non-inverted input terminal of the operational amplifier 32. The resistance of the resistor R1 is equal to that of the resistor R2 and the resistance of the resistor R3 is equal to that of the resistor R4.

It should be noted that the bias circuit 34 serves to provide a bias voltage signal to the operational amplifier 32 and is provided with resistors R5, R6 and R7 and a zener diode 35. The resistors R5, R6 and R7 are connected between the battery 10' and the ground (B+ and B− shown in FIG. 3) in a serial fashion and the zener diode 35 is coupled to the resistors R5 and R6 in a parallel fashion, assuring that the zener diode 35 serves to constantly maintain a voltage drop across the serial connection of the resistor R5 and R6 to thereby allow the bias circuit 34 to provide a constant bias voltage to the operational amplifier 32. The bias voltage developed between the resistors R5 and R6 is coupled via the resistor R4 to the non-inverted input terminal of the operational amplifier 32.

The first voltage signal from the shunt, i.e., the current detector 21, is coupled via the resistors R1 and R2 to the inverted and non-inverted input terminals of the operational amplifier 32, wherein the first voltage signal represents the difference between a voltage drop V1 at point "a" and a voltage drop V2 at point "b". The voltage drop V1 is greater than the voltage drop V2. At the operational amplifier 32, the first voltage signal is amplified up to the level predetermined by the gain thereof and then provided to the current control transistor 31.

The current control transistor 31, e.g., a PNP type transistor, is connected via the current limit resistor R9 to the battery 10' (B+ shown in FIG. 3) and also connected via the output resistor R8 to the ground (B− shown in FIG. 3). Stated differently, the base of the transistor 31 is coupled to the output terminal of the operational amplifier 32; the emitter is coupled via the current limit resistor R9 to the battery 10'; and the collector is connected via the output resistor R8 to the ground. As a result, the current control transistor 31 serves to receive the amplified first voltage signal from the operational amplifier 32 and to control the current flowing through the output resistor R8 to thereby allow the voltage detector 22 to provide the second voltage signal proportional to the first voltage signal via the output resistor R8 to the A/D converter 23.

Under the condition that the key switch 11' is turned on while the pump motor 15' is working, the current flowing through the shunt 21 changes depending on the variation of the load. That is, assuming that the PWM signal with a constant on-duty ratio is fed from the controller 24 to the drive transistor 16' and, therefore, the constant voltage is applied from the battery 10' to the pump motor 15', the amount of the current flowing through the shunt 21 varies with the load condition. Under the unloaded or not moving condition, the amount of current is smaller than that of other conditions. Inasmuch as the resistance of the shunt 21 remains fixed, the voltage drop across the shunt 21 is proportional to the current flowing therethrough according to the Ohm's law. In this case, since the resistance of the shunt 21 is equal to or smaller than about 0.003 Ω, the voltage drop thereacross is relatively small.

The first voltage signal representing the voltage drop is then coupled to the voltage detector 22 shown in FIG. 3. That is, the first voltage signal is coupled via the resistors R1 and R2 to the operational amplifier 32 which amplifies the first voltage signal by the gain determined by the resistors R1 to R4. The amplified first voltage signal Va is defined as follows:

$$V_a = (V2 - V1) \times \frac{R3(\text{or } R4)}{R1(\text{or } R2)} + V2 \qquad \text{Eq. 1}$$

wherein R1=R2 and R3=R4.

And then the amplified first voltage signal is relayed to the current control transistor 31 which is turned on in response to the amplified first voltage signal so that the current from the battery 10' is provided through the current limit resistor R9 and the transistor 31 to the output resistor R8. The current $I_\upsilon$ issuing from the transistor 31 can be defined as follows:

$$I_\upsilon = B_+ - I_1 R_9 - V_a \qquad \text{Eq. 2}$$

wherein $I_1$ denotes the current supplied to the transistor 31.

As can be seen from Eq. 2, the current $I_\upsilon$ changes depending on the amplified first voltage signal fed from the operational amplifier 32 which in turn varies with the amount of the current flowing through the shunt 21. Consequently, the current $I_\upsilon$ depends exactly on the load conditions.

A voltage drop across the resistor R8 is determined by the current $I_\upsilon$ and coupled as the second voltage signal to the A/D converter 23. The second voltage signal Vb is defined as follows:

$$V_b = I_1 \times R8 \qquad \text{Eq. 3}$$

At the A/D converter 23, the second voltage signal is converted into a digital voltage signal which is fed to the controller 24 as the current detection signal. In response to the digital voltage signal, the controller 24 regulates the PWM signal to thereby provide the regulated PWM signal to the base of the driving transistor 16'. As a result, the driving transistor 16' is repeatedly turned on and off depending upon the regulated PWM signal from the controller to thereby control the current flowing through the pump motor 15'.

That is, at the controller 24, the current detection signal is compared with the predetermined value, wherein the predetermined value is determined by using a loaded torque characteristic of the motor experimentally obtained. When the current detection signal is greater than the predetermined value, as in the heavy load condition, the on-duty ratio of the PWM signal is increased. However, when the current detection signal is smaller than the predetermined value, as in the unloaded or not moving condition, the on-duty ratio thereof is decreased. Therefore, the controller 24 can control the driving transistor by using the adjusted PWM signal to thereby maintain the torque and speed of the pump motor 15' low during the unloaded condition so as not to cause hydraulic cavitation but to increase the torque and speed during the loaded condition.

Figure 4:
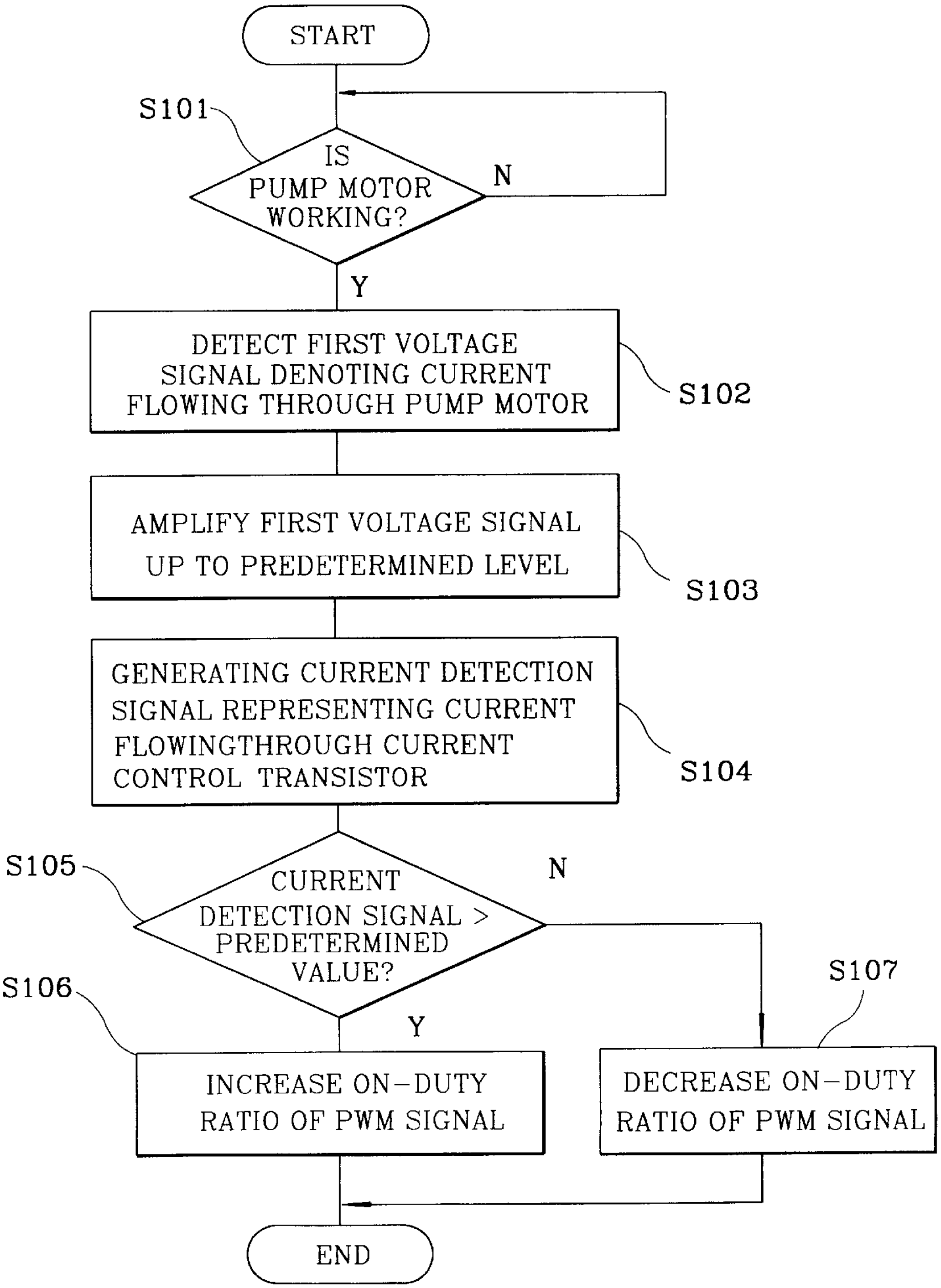
FIG. 4 is a flow chart demonstrating the operation of the pump motor control apparatus of the forklift truck in accordance with the present invention.

Referring to FIG. 4, there is demonstrated a flow chart for the control method of the pump motor in accordance with the present invention.

First, at step S101, it is determined whether, in response to the actuation of the key switch 11', the pump motor 15' is working. If the pump motor 15' is working, at step S102, the voltage drop across the shunt 21 is checked, wherein the voltage drop represents the amount of the current flowing through the pump motor 15'.

Thereafter, at step S103, the first voltage signal representing the voltage drop is amplified up to a predetermined level to thereby provide the amplified first voltage signal to the base of the current control transistor 31.

And then, at step S104, the current control transistor 31 is turned on in response to the amplified first voltage signal and the current flowing therethrough is detected by using the output resistor R8 to thereby generate a second voltage signal representing the detected current. The second voltage signal is then coupled to the A/D converter 23 which converts it to a digital voltage signal as the current detection signal.

At step S105, the current detection signal is then compared with the predetermined value in the controller 24.

According to the comparison results, the driving transistor 16' is controlled to adjust the current for use in determining the torque and speed of the pump motor 15'. If the current detection signal is greater than the predetermined value, at step S106, the on-duty ratio of the PWM signal is increased to thereby increase the torque and speed of the pump motor 15'. If not, at step S107, the on-duty ratio thereof is decreased to thereby reduce the torque and speed of the pump motor 15'. This process continues to be carried out until the operation of the pump motor 15' is ceased.

As can be seen from the above, since the controller can effectively monitors the current flowing through the pump motor and determines the load condition, it becomes possible to adaptively control the pump motor depending upon the load condition on a real time basis.

While the invention has been shown and described with reference to a preferred embodiment, it should be apparent to one of ordinary skill in the art that many changes and modifications may be made without departing from the scope of the invention as defined in the claims.

What is claimed is:

1. An apparatus for controlling a pump motor of a forklift truck through the use of a driving transistor connected between a battery and the pump motor, comprising:

a) current detection means for detecting electric current flowing through the pump motor, the current detection means including, (i) a shunt for sensing the current flowing through the pump motor to generate a first voltage signal, the shunt having a first terminal connected to the pump motor and a second terminal coupled to the battery, (ii) means for amplifying the first voltage signal to a predetermined level to produce a second voltage signal, and (iii) means for converting the second voltage signal to a current detection signal, the amplifying means includes: an operational amplifier with inverted and non-inverted input terminals, each connected to the first and second terminals of the shunt, and an output terminal; gain decision means having a first resistor connected between the inverted input terminal of the amplifier and the first terminal of the shunt, a second resistor connected between the inverted input terminal and the output terminal of the amplifier, a third resistor connected between the non-inverted input terminal of the amplifier and the second terminal of the shunt, and a fourth resistor connected to the inverted input terminal; and bias means for providing a bias voltage signal via the fourth resistor to the operational amplifier; and b) control means responsive to the current detection signal for determining load condition of the pump motor to apply a varying control signal to the driving transistor so that a varying amount of electric current can be fed to the pump motor in proportion to the load exerting on the pump motor.

2. The apparatus for controlling a pump motor of a forklift truck as recited in claim 1, wherein the amplifying means includes: said an operational amplifier for amplifying the first voltage signal to produce a first amplified voltage signal; a current control transistor operated by the operational amplifier for allowing the electric current corresponding to the first amplified voltage signal to flow therethrough; and output means for producing the second voltage signal as the current control transistor is operated.

3. The apparatus for controlling a pump motor of a forklift truck as recited in claim 1, wherein the bias means is provided with fifth, sixth and seventh resistors and a zener diode, the fifth, sixth and seventh resistors serially connected to the battery, the zener diode connected to the battery in parallel to the fifth and sixth resistors.

4. The apparatus for controlling a pump motor of a forklift truck as recited in claim 1, wherein the varying control signal is a pulse width modulation signal whose on-duty ratio varies with the load applied to the pump motor.

* * * * *